Nov. 8, 1960

C. D. FOSS 2,959,431

DUST GUARD AND SEAL FOR JOURNAL BOX

Filed July 26, 1954

INVENTOR
CURTIS D. FOSS
BY *Mason & Graham*
ATTORNEYS

United States Patent Office 2,959,431
Patented Nov. 8, 1960

2,959,431

DUST GUARD AND SEAL FOR JOURNAL BOX

Curtis D. Foss, 1237 Fuller Ave., Los Angeles 46, Calif.

Filed July 26, 1954, Ser. No. 445,753

1 Claim. (Cl. 286—6)

My invention has to do with devices for effecting a seal between a rotating shaft and a stationary housing and, in its more particular aspects, relates to an improved dust guard and seal to be mounted in the inner end of a conventional journal box of a railroad car. The present application is a continuation in part of my co-pending application, Serial No. 742,423, filed April 18, 1947, now U.S. Patent 2,692,783, issued October 26, 1954.

As is well known, the wheels of a railroad car are mounted on the axle at points spaced inwardly from the ends of the axle, the end portions of the axle outwardly from the wheels being usually reduced in diameter and extending into a conventional journal box in which the axle is journalled. The journal box is arranged to be packed with absorbent waste or the like for the reception of lubricant. Conventionally, it is the practice to mount in the inner end of the journal box (which is the end toward the wheel) a flexible rubber-like dust guard and seal which serves the double purpose of preventing escape of lubricant from the journal box and preventing entry of dust into the journal box. Conventionally, the axle is mounted to have some axial movement in the journal box. A difficulty with existing dust guard and seals is that the axial movement of the axle tends to cause the seal portion of the dust guard which immediately embraces the axle to move onto the reduced outer end portion of the axle which is journalled in the bearing, thus destroying the effectiveness of the seal.

It is therefore an object of my invention to provide a journal box dust guard and seal which is so constructed and arranged as effectively to prevent the seal portion from being moved onto the adjacent reduced diameter portion of the axle in response to axial movement of the axle. Other subordinate objects will appear hereinafter.

In the appended claim, I describe what I believe to be new in my improved dust guard and seal member, but for the purpose of making my invention more readily understood by those skilled in the art, I shall now describe, by reference to the accompanying drawing, presently preferred embodiments of my invention. In the drawing:

Figure 1:
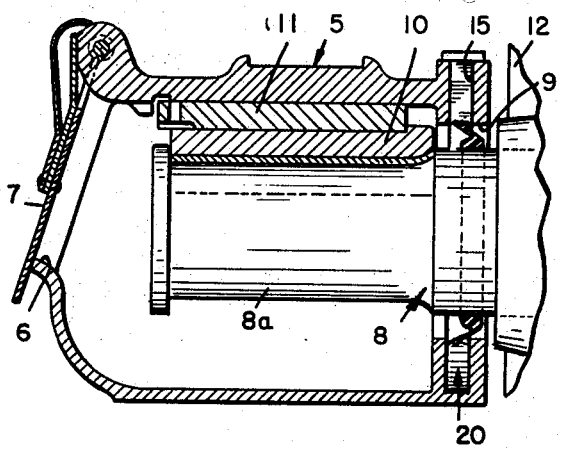
Fig. 1 is a longitudinal section of a journal box carrying my improved dust guard and seal.

Referring now to the drawing, Fig. 1, I show a conventional journal box 5 having an access opening 6 in its outer end portion covered by a hinged, spring loaded door 7. It will be understood, of course, that there is a like journal box at each end of the axle 8 and the reduced outer end portion 8a of the axle extends into the journal box through an opening 9 in its inner end. In this description I shall describe only one of the journal boxes, it being understood that the journal box at the opposite end of the axle is identical.

The reduced outer end of the axle is engaged by a conventional bearing 10 and a standard bearing wedge 11 is interposed between the top of the journal box and the bearing 10. The numeral 12 denotes a car supporting wheel affixed on the axle at a point spaced inwardly from the journal box. The inner end portion of the journal box presents a recess 15 for the reception of a dust guard and seal member. Up to this point in this description the construction described is conventional.

My improved dust guard and seal, designated generally 20, has a relatively stiff marginal portion which includes an upper body portion 22, a lower portion 22a and side portions 22b. Inwardly of the marginal portion is an inner portion 23 which encircles the axle. The marginal portion fits in the slot or recess 15 in the journal box except for a double flanged top section 25 which extends laterally beyond the top of the slot. A metal reinforcing member 24 is embedded in the marginal portion of the dust guard and seal.

The inner portion 23 of the device is relatively resilient and flexible and is composed of a membrane 40 and a seal ring 32. In the form of the invention shown in Fig. 3 the membrane has one accordion-like fold which includes an outermost section 30 and an innermost section 31, these being connected by a bend 33.

The novelty of my present invention resides in the relative form and arrangement of the membrane and seal ring and their relationship to the axle wheel, journal box and remainder of the dust guard and seal as will now be described.

Figure 3:
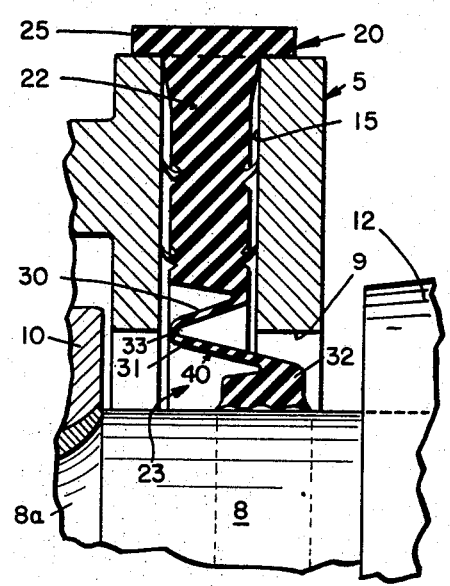
Fig. 3 is an enlarged cross-sectional view showing a preferred embodiment of my dust guard and seal mounted in a journal box and showing its relation to the axle, wheel and bearing.
Figure 2:
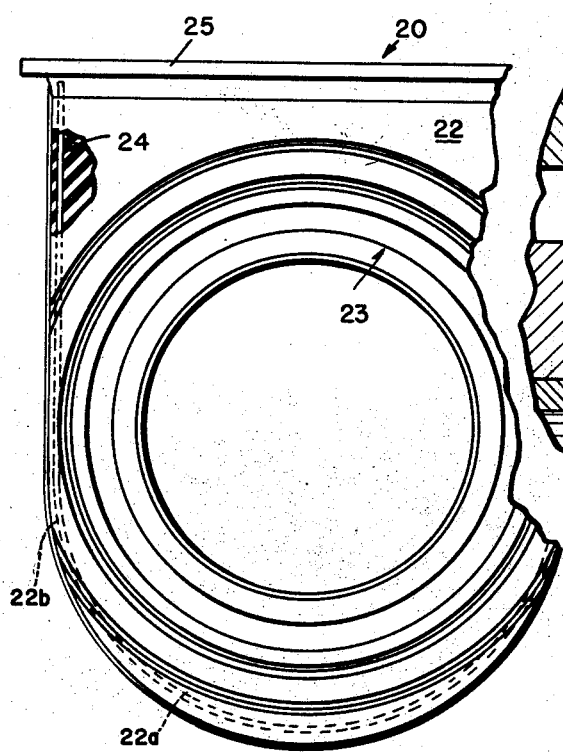
Fig. 2 is an enlarged elevational view of the dust guard and seal element.

As best shown in Fig. 3, the innermost section 31 of the membrane 40 is relatively wide as compared to the section 30 and extends diagonally beyond the remainder of the dust guard and seal. The seal ring 32 is carried at the free end of the section 31 of the membrane, the juncture of the parts being between the ends of the seal ring.

Thus, not only is the seal ring laterally offset toward the wheel and away from the plane of the journal box slot or recess 15, but also the disposition and relative width of the sections of the membrane are such that there is a greater resistance to movement of the ring 32 toward the interior of the journal box than there is to movement of the ring toward the wheel, so that axial shifting of the axle does not move the seal ring onto the reduced diameter portion 8a of the axle.

Figure 4:
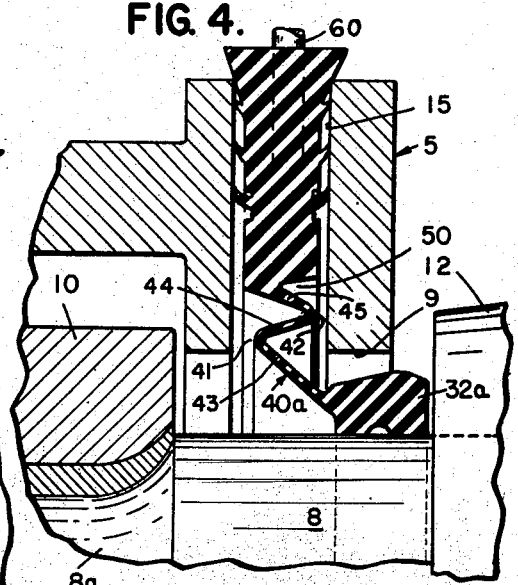
Fig. 4 is a view like Fig. 3, but showing a modified form of my invention.

In the embodiment of Fig. 4, the membrane indicated by 40a includes two folds or bends, 41 and 42. It also includes an innermost diagonally disposed section 43, a next innermost section 44 and an outermost section 45. The innermost section 43 is relatively wider than the other sections and extends diagonally toward the axle with its free end attached to the axially inner end of the seal ring 32a. Also the relative angularity between the innermost section 43 and the next innermost section 44 is greater than that between the latter section and the outermost section 45. The seal ring 32a projects toward the wheel and extends substantially beyond the plane of the side of the remainder of the dust guard and seal.

A handle may be provided such as indicated by numeral 60.

I claim:

In an assembly including an axially shiftable axle journalled at its outer end in a journal box having a vertical dust guard and seal member-receiving channel, the combination with said journal box and axle of a dust guard and seal member carried by said journal box at one end thereof and comprising a relatively stiff marginal portion mounted in and shaped to substantially conform to the channel in said journal box and an annular, resilient inner portion surrounding said axle, said inner portion including a membrane having at least one accordion-like fold within the planes of the sides of said marginal portion, the innermost section of said membrane being axially wider than the other section of the membrane and being disposed diagonally and axially outwardly of said journal box to a point axially beyond the contiguous membrane section, and a seal ring receiving said axle carried by the innermost portion of said innermost section of said membrane, said ring extending axially beyond the outer side of said marginal portion.

References Cited in the file of this patent

UNITED STATES PATENTS

| | | |
|---|---|---|
| 1,104,361 | Lassman | July 21, 1914 |
| 1,179,846 | Lassmann | Apr. 18, 1916 |
| 2,394,012 | Rayburn | Feb. 5, 1946 |
| 2,657,080 | Johnson et al. | Oct. 27, 1953 |
| 2,668,067 | Fitzsimmons | Feb. 2, 1954 |
| 2,692,783 | Foss | Oct. 26, 1954 |
| 2,758,853 | Beck | Aug. 14, 1956 |

FOREIGN PATENTS

| | | |
|---|---|---|
| 69,128 | Germany | May 8, 1892 |
| 711,737 | Germany | Oct. 6, 1941 |
| 562,456 | Great Britain | July 3, 1944 |
| 1,038,099 | France | May 6, 1953 |